Aug. 21, 1951   J. A. McCASKELL   2,565,388
FILTER
Filed June 15, 1945   2 Sheets-Sheet 2
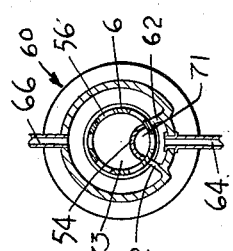
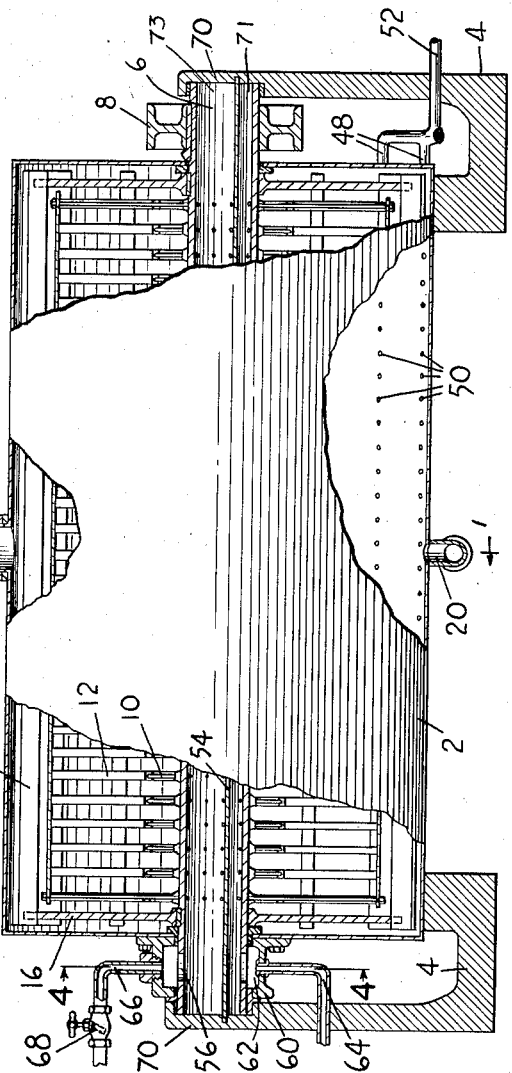
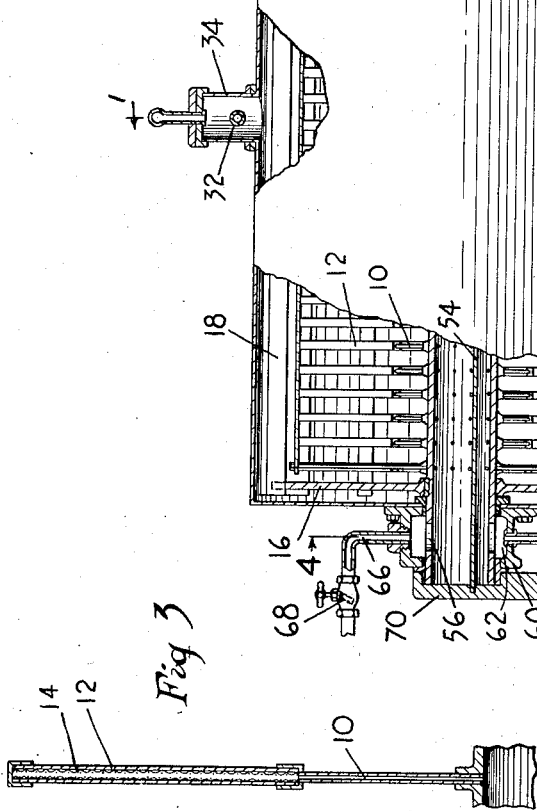
Jasper A. McCaskell, deceased
Inventor
Mary A. McCaskell
Executrix
By Hammond & Littell
Attorneys Patented Aug. 21, 1951

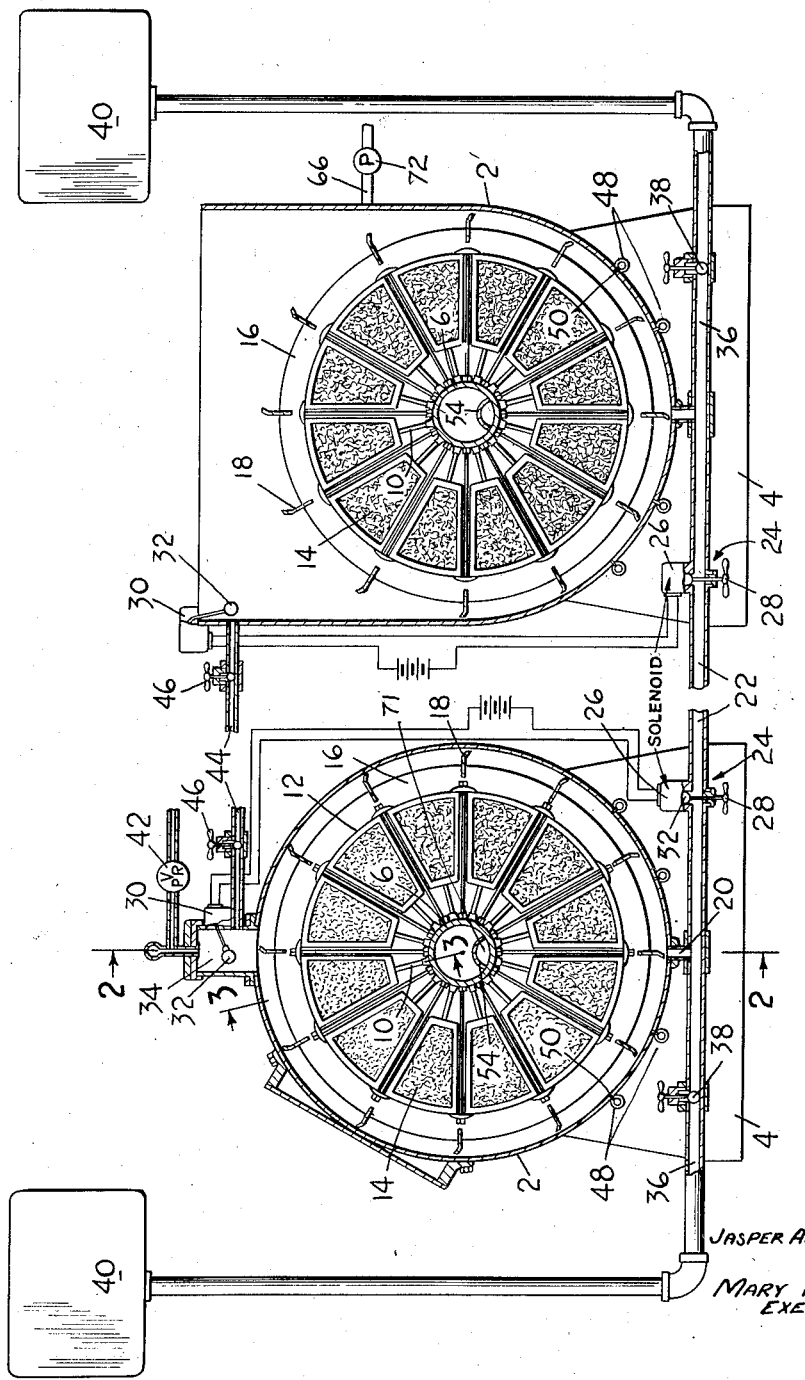

2,565,388

UNITED STATES PATENT OFFICE 2,565,388

FILTER

Jasper A. McCaskell, deceased, late of Los Angeles, Calif., by Mary A. McCaskell, executrix, Los Angeles, Calif., assignor, by mesne assignments, to McCaskell Filters, Inc., Los Angeles, Calif., a corporation of California Application June 15, 1945, Serial No. 599,617

8 Claims. (Cl. 210—200)

The invention relates to a process and apparatus for filtering liquids, and more especially for filtering a slurry containing a small percentage of solids in the form of very fine particles.

The primary object of the invention is to provide an effective and simple procedure for removing from a slurry very fine particles of solids. In the removal of such particles by the use of a filter, the fine particles alone are likely to clog the pores of the filter very quickly so that the filter cake must be removed at frequent intervals. It has been known to use a so-called "filter aid," which consists of a granular material of larger particle size which will prevent the fine particles from clogging the filter pores as they otherwise would. One material for this use is ordinary sand. However, where large quantities of liquids are being treated, this procedure is quite expensive as the filter aid is discharged along with the particles to be removed since substantial quantities of the filter aid are necessary. The present invention involves a process, as well as an apparatus for carrying out that process, in which the filter aid after a certain period of utilization is separated from the particles and retained in the apparatus while the particles are removed and discharged. This is accomplished in general by passing the liquid containing the filter aid and the particles to be removed suspended therein through a filter aid and against filter bodies for a prolonged period, and thereafter removing the particles from the filter aid by utilizing their differences in weight and washing the particles out of the device while the filter aid remains therein.

Another object of the invention is to provide an apparatus for utilizing a filter aid in which means are furnished for constantly agitating the slurry so as to keep the filter aid and the particles in suspension therein.

Still another object of the invention is to provide an arrangement of this type in which the filter cake which forms on the filtering bodies is periodically removed from them, thereby building up a heavy concentration of particles in the slurry to be washed out at spaced intervals of time.

Further objects and advantages of the invention will appear more fully from the following description, particularly when taken in conjunction with the accompanying drawings which form a part thereof.

In the drawings:

Fig. 1 is a vertical cross-section through an apparatus embodying my invention taken along the line 1—1 of Fig. 2.

Fig. 2 is a side elevation, with parts in section substantially on the line 2—2 of Fig. 1.

Fig. 3 is a fragmentary cross-section of a filter element on an enlarged scale taken along the line 3—3 of Fig. 1.

Fig. 4 is a cross-section on the line 4—4 of Fig. 2.

Fig. 5 is a view similar to Fig. 1 of a modified form of the invention.

The apparatus shown in Figs. 1 to 4 is adapted to operate under pressure. It includes a cylindrical tank or casing 2 mounted on a base 4. Rotatably mounted within the casing is a hollow shaft 6 which can be turned from any suitable source of power by a pulley 8. Shaft 6 has extending from its periphery within the tank a plurality of pipes 10 connecting the interior of the shaft to the interiors of frames 12 which are covered by filter cloth or any other suitable filtering medium 14. Filter frames 12 are of sector shape as shown in Fig. 1, and form a complete disc around the axis of the shaft 6. At the ends of the drum 2 the shaft 6 carries frames 16 upon which are mounted blades 18 located adjacent the periphery of the drum and extending radially with respect thereto. Blades 18 run from end to end of the drum.

An inlet pipe 20 enters the bottom of the drum 2, and is connected by a pipe 22 to a source of water or other liquid to be filtered. Within the pipe 22 is a valve 24 which may be controlled either by a solenoid 26 or by a manual handle 28. Solenoid 26 is controlled by a switch 30 connected to a float 32 arranged in an upward extension 34 communicating with the interior of the drum 2.

Pipe 20 is also connected by a pipe 36 containing a manually controlled valve 38 to a tank 40 or other suitable source of water.

Connected to chamber 34 is a pressure relief valve 42 which will relieve excess pressure in the tank. Also connected to this chamber is a pipe 44 containing a manually controlled valve 46 the purpose of which will be explained hereafter. A series of pipes 48 extend along the bottom wall of the tank 2 and communicate with the interior thereof through holes 50. Pipe 52 connects pipes 48 to any suitable source of air under pressure.

In the bottom part of shaft 6 is a stationary dividing wall 54 which may close off a space 71 less than twice the distance between adjacent pipes 10. Shaft 6 at the end opposite pulley 8 has slots 56 therein (Figs. 2 and 4). These slots are arranged within a cylindrical casing 60 which is divided into two chambers by walls 62. The lower chamber, which is of small angular extent, is supplied with compressed air by a pipe 64.

The upper chamber is connected to a discharge pipe 66 containing a check valve 68. The ends of shaft 6 are closed by caps 70 which may be parts of the frames 4.

The operation of this device is as follows:

A suitable filter aid material such as sand is placed in the tank and falls to the bottom. The filter aid should be selected so that it has a greater average particle size than the particles to be filtered from the liquid. Valve 24 is opened and a liquid slurry to be filtered is admitted to the tank. This slurry fills the tank until it raises float 32, whereupon switch 30 causes valve 24 to close. Shaft 6 is now rotated and the filter bodies 12 move through the liquid. Blades 18 stir up the sand and keep it suspended in the liquid, and air entering through holes 50 has the same effect. Excess air pressure is relieved by the valve 42. The filter aid and the particles are held back by the filter cloth 14, while the liquid passes through the cloth and through pipes 10 to the interior of shaft 6, and thence through pipe 66 and valve 68 to a place of use. At each revolution of the shaft, each pipe 10 comes into communication with the lower space 71 (Figs. 2 and 4) within the shaft 6. The compressed air entering through pipe 64, which is at a higher pressure than the pressure in the tank, then kicks off any filter cake which may have been formed on the filter cloth 14 and this action, together with the agitation created by the air from holes 50, breaks up the filter cake and leaves it suspended in the unfiltered liquid.

Of course as the liquid escapes through shaft 6 and the level of liquid in the tank drops, float 32 falls and allows valve 24 to reopen to admit more liquid to the tank. Thus for a certain period of time the process operates substantially continuously.

After a certain interval of time, the concentration of particles in the slurry becomes so great that further filtering of the liquid is difficult. When this happens, valve 24 is closed and the rotation of the shaft 6 is stopped. Valves 46 and 38 are now opened and water from tank 40 flows upward through the tank 2 and out through pipe 44. This water entering at the bottom of the tank washes up with it the light particles in the slurry. However, the sand of the filter aid being heavier than the particles is not carried along by the water but settles back to the bottom of the tank. When a sufficient amount of water has thus washed through the tank, the sand is ready for another operation. The valves 38 and 46 are closed, valve 24 is opened and the shaft is again turned through another similar cycle of operation By this procedure the sand may be used over and over and need not be thrown away each time it becomes clogged with too many fine particles of material. At the same time, however, the filter aid is always present to permit prolonged filtering operations without clogging the pores of the filters.

Fig. 5 shows a modified form of device in which the liquid is drawn through the tank by suction. In these figures, the same reference characters represent the same parts as in Figs. 1 to 4. In addition to those parts shown on the drawings which are the same as in Figs. 1 to 4, there is arranged in the outlet pipe 66 (shown protruding from the end of the device) a suction pump 72 which creates a lower pressure in space 73 and the interior of the filter frames 12 so as to draw the water or other liquid through the filter cloth. In this form container 2 may be opened. Float valve 32 cuts off supply of liquid to be filtered through valve 24 when the proper level in casing 2 has been reached.

This arrangement is controlled and operated in the same manner as that shown in Figs. 1 to 4. Pump 72 is turned on, after the tank has been filled with liquid to be filtered, and shaft 6 is rotated. When a substantial quantity of fine particles has accumulated within the tank, pump 72 is stopped and the rotation of shaft 6 also stopped. The valve 38 is then opened and valve 24 is manually closed, so that water flows through the tank to wash out the fine particles, leaving the sand or other filter aid behind.

It will be noted that in either form of the invention the filter elements, while being maintained at all times in contact with the liquid to be filtered, are periodically back-washed by compressed air or other fluid to remove filter cake and filter aid therefrom, and at the same time to break up the filter cake and cause it to be resuspended in the liquid. It will also be apparent that the filter aid is continually agitated during the normal filtering operation to hold it in suspension in the liquid.

While some embodiments of the invention have been described herein, it is wished to be understood that it is not intended to limit the same thereby except within the scope of the appended claims.

What is claimed is:

1. A filtering device comprising a container adapted to hold a filter aid composed of particles of greater size and weight than the particles contained in a liquid to be filtered, a filter element in said container having filtering surfaces through which said filter aid will not pass, filtrate removal conduit means connected to said filter elements, liquid to be filtered conduit connected to said container and having its outlet adjacent the bottom of said container, a filter aid having particles of greater size and weight than the particles to be filtered, said filter aid being in suspension in the liquid to be filtered during the filtering operation, wash liquid supply conduit means connected to said container adjacent the bottom thereof, wash liquid outlet conduit means connected to said container adjacent the top thereof, and control means operable to open said wash liquid supply and outlet conduit means after closure of the liquid to be filtered supply conduit, so that the wash liquid flows through said filter aid and container removing from the container filtered particles from said filter aid retained in the container and filtering surface.

2. In a device as claimed in claim 1, a chamber means mounted within a hollow shaft making connection to said filter element once each rotation thereof, and fluid pressure supply means making connection to said chamber for removing filter cake from said filter element once during each rotation of the shaft.

3. A filtering apparatus comprising a tank, a hollow shaft rotatably mounted in said tank, a plurality of hollow filter bodies radially arranged around and carried by said shaft, conduit means connecting the inside of said filter bodies to the inside of said shaft, liquid feeding means connected to said tank for feeding a liquid to be filtered into said tank and filtrate out from the interior of said shaft, said tank being adapted to contain a filter aid composed of particles of greater size and weight than the particles in the liquid to be filtered, control means connected to said supply conduit for rendering said liquid feeding means inoperative so as to stop the flow of liquid to be filtered through the tank and filter bodies, wash liquid conduit means connected to said tank for passing wash liquid through the tank to wash out the smaller bodies from the filter aid within said tank exteriorly of said filter bodies, and a wash liquid outlet connected to said tank separate from the filtrate outlet, said wash liquid conduit and outlet being constructed and arranged to retain the filter aid in the tank.

4. In a filtering device, a tank, a horizontal hollow shaft rotatably mounted in said tank, a hollow filter element carried by said shaft and having conduit means leading to the interior of said shaft, a stationary wall mounted within said shaft and having edges extending substantially into contact therewith to form a chamber and extending along said shaft, said conduit means being connected to said chamber once during each revolution of the shaft, fluid pressure conduit means connected to said chamber, a liquid to be filtered conduit connected to said tank feeding liquid through said tank and filter element and out through said hollow shaft, and a fluid pressure means connected to said fluid pressure conduit means supplying fluid pressure periodically to said filter body during each rotation of said shaft so as to remove filter cake from the filter elements.

5. A filtering apparatus comprising a tank, a hollow shaft rotatably mounted in said tank, a plurality of hollow filter bodies radially arranged around and carried by said shaft, conduit means connecting the inside of said filter bodies to the inside of said shaft, liquid to be filtered conduit means connected to said tank for feeding a liquid to be filtered into said tank and out from the interior of said shaft, said tank being adapted to contain and retain a filter aid composed of particles of greater size and weight than the particles in the liquid to be filtered, blades on said filter element agitating said filter aid during filtration to maintain said aid in suspension in the liquid to be filtered, control means connected to said supply conduit for rendering said liquid feeding means inoperative to stop the flow of liquid to be filtered through the tank and said filter body, wash liquid conduit means connected to said tank for passing wash liquid through the tank to wash out the smaller bodies from the filter aid within said tank exteriorly of said filter bodies, and a wash liquid outlet connected to said tank separate from the filtrate outlet arranged so that filter aid will remain in the container during the washing.

6. A filtering apparatus comprising a horizontally arranged cylindrical tank, a hollow shaft rotatably mounted in said tank and coaxial therewith, a plurality of hollow filter bodies radially arranged around and carried by said shaft, conduit means connecting the inside of said filter bodies to the inside of said shaft, liquid to be filtered conduit means connected to said tank feeding liquid into said tank and out from the interior of said shaft, said tank containing a filter aid composed of particles of greater size and weight than the particles in the liquid to be filtered, air supply means connected to the bottom of said tank supplying air agitating the contents thereof and keeping the filter aid in suspension during filtration, control means connected to said liquid to be filtered supply conduit operable to stop the flow of liquid to be filtered through the tank and said filter bodies, wash liquid supply conduit means connected to said tank adjacent the bottom for passing liquid through the tank, said wash liquid washing out the smaller bodies from the filter aid within said tank exteriorly of said filter bodies, and wash liquid outlet means connected adjacent the top of said tank.

7. A filtering apparatus comprising a horizontally arranged cylindrical tank, a hollow shaft rotatably mounted in said tank and coaxial therewith, a plurality of hollow filter bodies radially arranged around and carried by said shaft, conduit means connecting the inside of said filter bodies to the inside of said shaft, agitating blades connected to said shaft and rotatable therewith, liquid to be filtered conduit means connected to said tank feeding liquid into said tank, conduit means connected to said shaft removing filtrate and from the interior of said shaft, said tank containing a filter aid composed of particles of greater size and weight than the particles in the liquid to be filtered, air supply means connected to the bottom of said tank supplying air agitating the contents thereof and keeping the filter aid in suspension during filtration, control means connected to said liquid to be filtered supply conduit operable to stop the flow of liquid to be filtered through the tank and said filter bodies, wash liquid supply conduit means connected adjacent to the bottom of said tank for passing liquid through the tank, said wash liquid washing out the smaller bodies from the filter aid within said tank exteriorly of said filter bodies, and wash liquid outlet means connected adjacent to the top of said tank.

8. In a device as claimed in claim 7, a chamber means mounted within said hollow shaft connected at each rotation thereof to said filter bodies in succession, and fluid pressure supply means connected to said chamber for removing filter cake from the filter bodies once during each rotation of the shaft.

MARY A. McCASKELL,
*Executrix of the Estate of Jasper A. McCaskell, deceased.*

REFERENCES CITED

The following references are of record in the file of this patent:

UNITED STATES PATENTS

| Number | Name | Date |
|---|---|---|
| 920,739 | Hedges et al. | May 4, 1909 |
| 1,266,133 | McCaskell | May 14, 1918 |
| 1,446,448 | Brown | Feb. 27, 1923 |
| 1,450,560 | Morton | Apr. 3, 1923 |
| 1,494,122 | McCaskell | May 13, 1924 |
| 1,515,130 | Morrison | Nov. 11, 1924 |
| 1,533,032 | Sauer | Apr. 7, 1925 |
| 1,619,042 | Sauer | Mar. 1, 1927 |
| 1,627,343 | Sauer | May 3, 1927 |
| 1,700,772 | McCaskell | Feb. 5, 1929 |
| 1,894,323 | Osterstrom | Jan. 17, 1933 |
| 2,037,134 | Jaeger | Apr. 14, 1936 |
| 2,156,291 | Hurt | May 2, 1939 |
| 2,221,210 | Soderquist | Nov. 12, 1940 |

FOREIGN PATENTS

| Number | Country | Date |
|---|---|---|
| 9,314 | Great Britain | A. D. 1891 |